United States Patent
Nayak et al.

(10) Patent No.: US 7,225,283 B1
(45) Date of Patent: May 29, 2007

(54) ASYNCHRONOUS ARBITER WITH BOUNDED RESOLUTION TIME AND PREDICTABLE OUTPUT STATE

(75) Inventors: Anup Nayak, Fremont, CA (US);
Dimitris Pantelakis, Austin, TX (US);
Fariborz Golshani, San Jose, CA (US);
Derwin Mattos, San Mateo, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 132 days.

(21) Appl. No.: 11/019,702

(22) Filed: Dec. 21, 2004

Related U.S. Application Data (60) Provisional application No. 60/531,852, filed on Dec. 23, 2003.

(51) Int. Cl.
*H03K 5/19* (2006.01)
(52) U.S. Cl. .................. 710/241; 326/94; 327/19
(58) Field of Classification Search ................. 326/94; 327/19; 710/241
See application file for complete search history.

(56) References Cited

U.S. PATENT DOCUMENTS

| | | | | |
|---|---|---|---|---|
| 4,398,105 A | * | 8/1983 | Keller | 327/19 |
| 4,620,118 A | | 10/1986 | Barber | |
| 4,757,217 A | * | 7/1988 | Sawada et al. | 327/19 |
| 4,841,178 A | * | 6/1989 | Bisson | 327/19 |
| 4,998,027 A | * | 3/1991 | Mihara et al. | 327/19 |
| 5,138,189 A | * | 8/1992 | Leung et al. | 327/198 |
| 5,398,211 A | | 3/1995 | Willenz et al. | |
| 5,682,114 A | * | 10/1997 | Ohta | 327/276 |
| 6,018,785 A | | 1/2000 | Wenniger | |
| 6,498,513 B1 | * | 12/2002 | Reynolds | 326/94 |
| 6,625,711 B1 | | 9/2003 | Raza et al. | |
| 6,674,306 B1 | * | 1/2004 | Reynolds | 326/94 |
| 6,715,021 B1 | | 3/2004 | Paul et al. | |
| 6,781,418 B1 | | 8/2004 | Reynolds | |
| 6,816,955 B1 | | 11/2004 | Raza et al. | |
| 6,816,979 B1 | | 11/2004 | Chen et al. | |
| 6,853,218 B1 | | 2/2005 | Reynolds | |
| 6,906,566 B2 | * | 6/2005 | Drexler | 327/158 |
| 6,919,735 B2 | * | 7/2005 | Porter et al. | 326/26 |
| 7,039,824 B2 | * | 5/2006 | Simon et al. | 713/400 |

FOREIGN PATENT DOCUMENTS

GB     2225460 A   *   5/1990

OTHER PUBLICATIONS

U.S. Appl. No. 11/019,731, Ross, Mark A.

* cited by examiner

*Primary Examiner*—Paul R. Myers
(74) *Attorney, Agent, or Firm*—Haverstock & Owens LLP (57) ABSTRACT

An arbiter circuit (100) can include a latch (106) that latches competing input signals (Req_A and Req_B) to generate latch output signals (latn1 and latn2). A filter section (108) can prevent metastable states of latch output signals (latn1 and latn2) from propagating through to output signals (Sel_A and Sel_B). If both input signals (Req_A and Req_B) are activated, a feedback circuit (110) can activate a feedback signal (fb) after a predetermined delay (δ), provided both output signals (Sel_A and Sel_B) remain inactive.

20 Claims, 6 Drawing Sheets

ASYNCHRONOUS ARBITER WITH BOUNDED RESOLUTION TIME AND PREDICTABLE OUTPUT STATE

This application claims the benefit of U.S. provisional patent application Ser. No. 60/531,8542, filed Dec. 23, 2003.

TECHNICAL FIELD

The present invention relates generally to circuits having asynchronous timing of signals, and more particularly an arbiter circuit for resolving conflicts between competing inputs in an asynchronous device, such as a random access memory.

BACKGROUND OF THE INVENTION

Asynchronous arbiters or arbiters can resolve (e.g., arbitrate) conflicts between two signals that are received essentially simultaneously. Arbiters play an important role in asynchronous dual port random access memories (RAMs). Arbiters generally have two "request" inputs and two "grant" outputs and resolve conflicts between two conflicting simultaneously received or asserted inputs.

A drawback to conventional asynchronous arbiters can be the presence of metastability conditions. A metastability condition can result from two simultaneously asserted inputs that result in both outputs being either high or at an approximately equal intermediate voltage level. A metastability condition can increase a resolution time by an indefinite amount. Consequently, timing cannot be guaranteed for a conventional asynchronous dual-port RAM subject to a metastability condition.

To better understand various aspects of the embodiments, a conventional asynchronous arbiter will now be described. A conventional asynchronous arbiter is set forth in FIG. 6, and designated by the general reference character 600.

Figure 6:
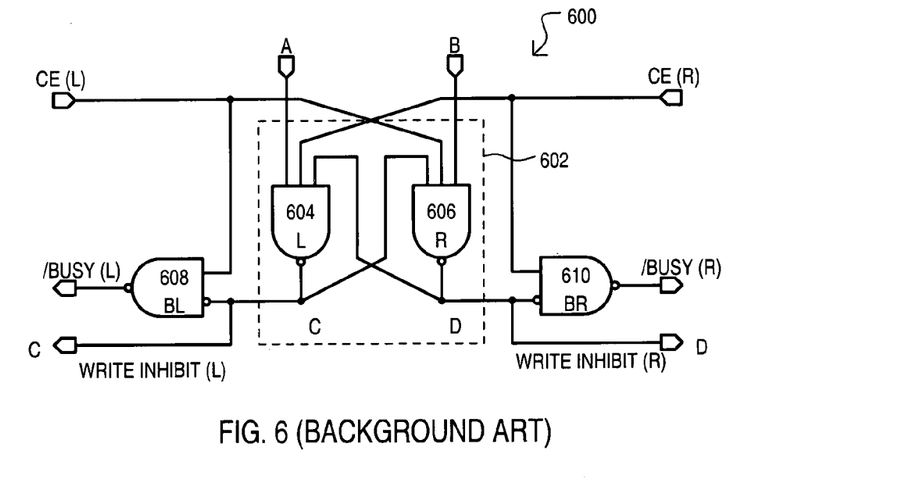
FIG. 6 is a schematic diagram of a first conventional arbiter circuit.

A conventional asynchronous arbiter 600 can receive enable signals CE(L), CE(R), as well as input signals A and B. In response, conventional asynchronous arbiter 600 can provide output signals C (WRITE INHIBIT (L)) and D (WRITE INHIBIT (R)), as well as busy signals /BUSY(L) and /BUSY(R). Ideally, conventional asynchronous arbiter 600 ensures that regardless of whether one or both of signals A and B are active (high in this case), only one of signals C or D is active (low in this case).

The conventional asynchronous arbiter of FIG. 6 includes a latch 602 formed by cross-coupled NAND gates 604 and 606. In addition, NAND gate 608 can receive enable signal CE(L) and output signal C (by way of inverting input) as inputs, and generate signal /BUSY(L). Similarly, NAND gate 610 can receive enable signal CE(R) and signal D (by way of inverting input) as inputs, and generate signal /BUSY(R).

When both input signals A and B are de-asserted (in this case, low) output signals C and D can attain a logical "True" state (in this case, high). When input signal A is asserted (goes high), corresponding output signal C can transition to a logical "low" state. This translates to input signal A "winning" the arbitration. That is, while input signal A remains asserted, other output signal D will remains in the "high" or unselected state, regardless of the value of input signal B. Similarly, if input signal B is asserted alone, output signal D can go to a "low" or selected state, and output signal C can remain in the unselected state regardless of the value of signal A.

However, if both input signals A and B are asserted essentially simultaneously, output signals C and D can be placed in metastable or unresolved state, until latch 602 can settle down in favor of either output signal C or D. The resolution time required for a latch 602 to resolve a metastable state is finite, but can be unpredictable.

The above unpredictability in resolution time can create functional failures in a circuit surrounding the arbiter that can depend on the arbiter making an exclusive choice between outputs C and D in a set period of time. Many conventional approaches to alleviate this problem are known.

Figure 7:
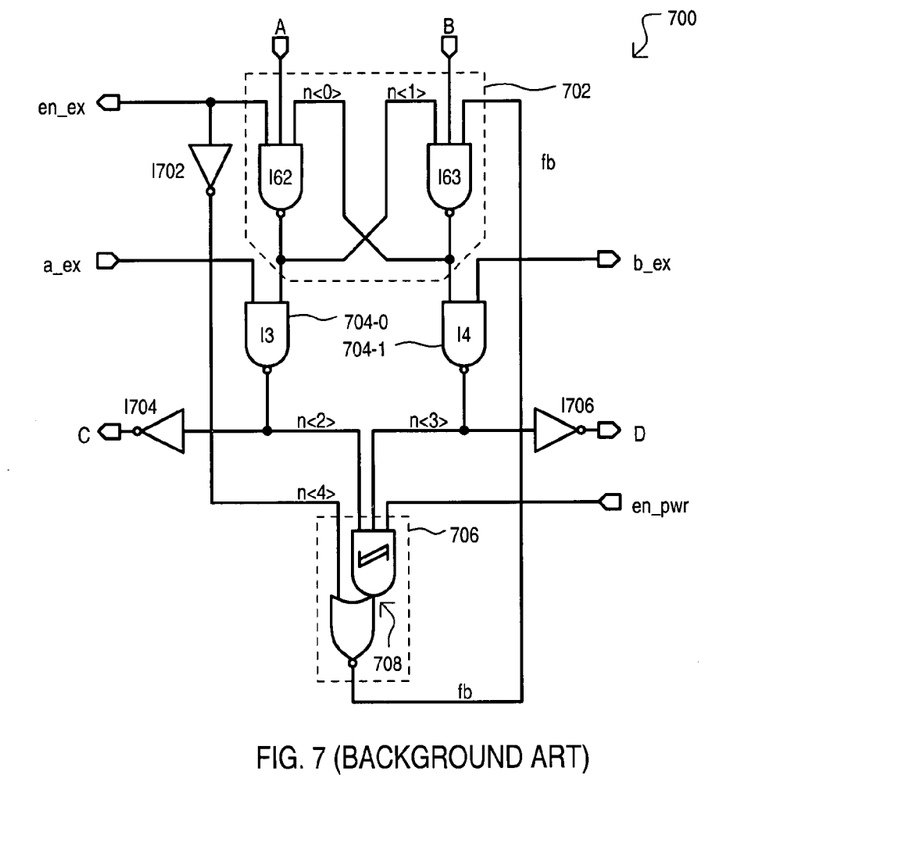
FIG. 7 is a schematic diagram of a second conventional arbiter circuit.

One conventional approach that attempts to address the above problem is shown in FIG. 7, and designated by the general reference character 700. Conventional arbiter 700 can include a latch 702, filter gates (704-0 and 704-1), and decision logic 706. In addition, inverters I702, I704 and I706 are included to provide desired logic levels.

Latch 702 can include cross-coupled three-input NAND gates 162 and 163. Gate 162 can receive an enable signal "en_ex", input signal A, and the output of gate 163 (n<0>), as inputs. Gate 163 can receive input signal B, output of gate 162 (n<1>), and output of decision logic 706 (fb), as inputs.

Filter gates (704-0 and 704-1) can be two-input NAND. NAND gate 13 can receive signal n<1> and an enable signal "a_ex" as inputs, and provide filtered output signal n<2> as an output. Similarly, NAND gate 14 can receive signal n<0> and an enable signal "b_ex" as inputs, and provide filtered output signal n<3> as an output. NAND gates 13 and 14 can be designed as metastability filters. According to well understood techniques, such as transistor sizing and/or transistor threshold adjustment, NAND gates 13 and 14 can provide high output signals when the corresponding input signal n<0> and n<1>, are in a metastable state (assuming the corresponding enable signal "a_ex" or "b_ex" is high).

Decision logic 706 can include an AND-NOR combination circuit 708. An AND portion can receive filtered output signals n<2> and n<3> as inputs along with a power enable signal "en_pwr". NOR portion can receive as inputs the output of AND portion, as well as enable signal "en_ex" by way of inverter I702. The output of AND-NOR circuit 708 can be feedback signal "fb".

Referring still to FIG. 7, in the event a metastable condition arises (e.g., both output signals n<0> and n<1> are low, or at some intermediate voltage level), filter gates (704-0 and 704-1) can force filtered output signals n<2> and n<3> to a high level.

Assuming signals "en_pwr" and "en_ex" are both high, in response to filtered output signals n<2> and n<3> being high, decision logic 706 can drive feedback signal "fb" low. This can force output signal n<0> high and hence output signal n<1> low, thus resolving the metastable state and settling the state of latch 702.

In this way, the conventional approach of FIG. 7 makes use of a feedback mechanism to steer an arbiter latch to one side (or output) when the latch gets stuck in metastable condition, thereby yielding a predictable output state.

While the approach of FIG. 7 can be an improvement over that of FIG. 6, such an approach may not be wholly satisfactory for a number of reasons. In particular, the conventional circuit of FIG. 7 can suffer from two disadvantages.

First, the functionality of the circuit can be dependent on the assumption that when latch 702 is in a metastable state, input filtered gates 13 and 14 are always interpreted as logic "low". That is, the conventional arbiter 700 should ensure that under all circumstances, i.e., under all temperature and voltage conditions, the trip point of NAND gates 13 and 14 are well above the possible metastable levels of signals n<0> and n<1> output from latch 702. Unfortunately, this can be difficult to achieve.

Because latch 702 and filter gates 13 and 14 are two different types of circuits (three-input NAND gates vs. two-input NAND gates), it is probable that in at least some situations their relative trip points will not track one another. Because of this weakness (not isolating the metastable states in a reliable fashion), metastability can propagate to the downstream nodes, potentially causing functional failures.

A second disadvantage can be that the conventional arbiter circuit of FIG. 7 can be prone to kicking-in in undesirable circumstances. For example, even when the two inputs are transitioning into and out of valid states, a feedback effect (signal "fb" going low) may kick-in, causing undesirable glitches.

Figure 8:
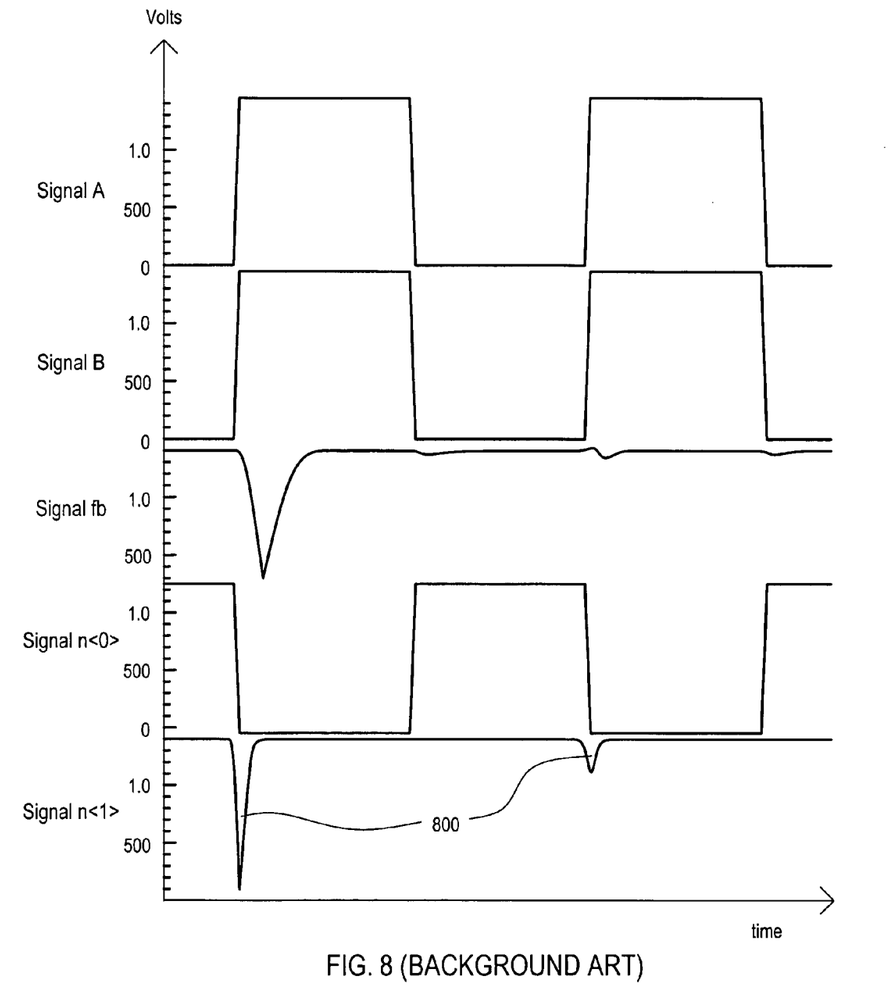
FIG. 8 is a timing diagram illustrating a drawback to the circuit of FIG. 7.

Such an arrangement is illustrated in FIG. 8. FIG. 8 is a timing diagram showing various signals of FIG. 7, including input signals A and B, feedback signal "fb", and output signals n<0> and n<1>.

FIG. 8 illustrates how if both latch input signals (A and B) are near simultaneously asserted from a de-asserted state (transition from high to low), latch 702 can decide to assert output signal n<1> low. That is, latch 702 may start to establish input signal A is the "winning" signal. However, before latch 702 completes the transition in output signal n<1>, feedback generated by filter section 704 and decision logic 706 can drive feedback signal "fb" low, which favors driving output signal n<0> low. As a result, output signal n<1> can experience a glitch 800 that can cause functionality problems in following circuit blocks of a device.

The above problem may be aggravated by advanced manufacturing processes. More particularly, current deep submicron technologies can produce devices that can cause latches to settle very fast. In such circumstances, an uncontrolled feedback circuit can hamper the normal functioning of the latch by settling to logic values opposite to those forced by a feedback circuit, or the like.

Accordingly, there is a need for an arbiter circuit that does not propagate metastability state. At the same time, such an arbiter circuit should provide an essentially glitch free output. It is further desirable that such an arbiter circuit has a bounded resolution time, and reliably generate a predictable output state.

SUMMARY OF THE INVENTION

The embodiments of the present invention can provides a solution to these and other problems, and offer further advantages over conventional arbiter circuits.

According to one embodiment, an asynchronous arbiter can resolve which one of a pair of simultaneous asserted input signals is represented at first and second outputs of the arbiter. An arbiter can include a latch having a first arbiter input coupled to a first input signal and a second arbiter input coupled to a second input signal. The asynchronous arbiter can also include a feedback circuit with a "kicker" circuit and feedback logic. A kicker circuit can be coupled to the first and second input signals and activate a kick signal in response to the first and second input signals having predetermined logic values with respect to one another. Feedback logic can activate a feedback signal when the a first arbiter output signal, second arbiter output signal, and the kick signal, have predetermined logic values with respect to one another.

In such an arrangement, a feedback circuit can generate a kick signal in response to input signals, as opposed to filtered input signals. This can allow a feedback signal to be activated (e.g., kicked in) a set time after a potentially metastable condition occurs.

According to one aspect of the embodiments, a kicker circuit can include a kicker logic gate having at least a first kicker gate input coupled to the first arbiter input, a second kicker gate input coupled to the second arbiter input, and a kicker gate output that provides the kick signal.

In this way, a kicker circuit can activate a kick signal in response to input signal values, and not filtered signal values. Thus, activation of a kicker circuit is not affected from a metastable condition propagating through the asynchronous arbiter.

According to another aspect of the embodiments, a kicker circuit can include a delay circuit that delays the activation of the kick signal by a predetermined amount with respect to the first and second input signals.

Such an arrangement can delay the activation of a kick signal (and hence a feedback signal) for a set period of time. This can prevent the generation of glitches in the event a metastable condition is resolved by other portions of the asynchronous arbiter within the set period of time.

According to another aspect of the embodiments, a latch can force first and second latch output values to predetermined settled values within a normal settling time when first and second input signal transitions do not introduce a metastable condition. In addition, a predetermined amount of delay of a delay circuit in a kicker circuit can be no less than the normal settling time.

Such an arrangement can help to ensure a latch is given sufficient settling time prior to activating a kick signal. This can prevent the generation of glitches. At the same time, the predetermined amount delay bounds the resolution time to a set duration.

According to another aspect of the embodiments, a delay circuit can introduce one predetermined amount of delay in response to at least one input signal rising, and another predetermined amount of delay in response to the at least one input signal falling.

Such an arrangement can help to ensure that a feedback signal is terminated in the event input signals transition to a stable state from a metastable state.

According to another aspect of the embodiments, a kicker circuit can further include a kicker logic gate having at least a first kicker gate input coupled to the first input, a second kicker gate input coupled to the second input, a third kicker gate input, and a kicker gate output that provides the kick signal. A delay circuit can have delay circuit inputs coupled to the first and second arbiter inputs, and an output coupled to the third kicker gate input.

In this way, a kicker circuit can generate a kick signal that is delayed when input signals are a metastable state, and is terminated when input signals transition to a non-metastable state.

According to another aspect of the embodiments, a latch can include cross-coupled first and second logic gates. The second logic gate can force the second gate output to a predetermined settled value in response to the feedback signal being activated.

In one very particular approach, a second logic gate can include a first gate transistor of a first conductivity type having a source-drain path coupled between one power supply and a second gate output, and gate coupled to the other of the arbiter inputs, a second gate transistor of the first conductivity type having a source-drain path arranged in series with that of the first gate transistor between the one power supply and second gate output, and a gate coupled to the one of the arbiter inputs, a third gate transistor of a second conductivity type having a source-drain path coupled between another power supply and the second gate output, and a gate coupled to other of the arbiter inputs, and a fourth gate transistor of the second conductivity type having a source-drain path in parallel with that of the third gate transistor between the other power supply and the second gate output, and a gate coupled the one of the arbiter inputs. In addition, a second logic gate can include a first feedback transistor of the first conductivity type having a source-drain path in parallel with that of the first and second gate transistors between the one power supply and the second gate output, and a gate coupled to receive the feedback signal, and a second feedback transistor of the second conductivity type having a source-drain path in series with that of the fourth gate transistor between the other power supply and the second gate output, and a gate coupled to receive the feedback signal.

According to another aspect of the embodiments, an asynchronous arbiter can further include a metastability filter that maintains a first arbiter output signal and second arbiter output signal at inactive levels when the first latch output signals and second latch output signals differ by less than a predetermined limit. In one very particular arrangement, such a limit can be a transistor threshold.

In this way, metastable conditions at a latch output can be prevented from propagating to other portions of the asynchronous arbiter.

According to another aspect of the embodiments, a metastability filter can include a first transistor of a first conductivity type having a source coupled to the first latch output, a gate coupled to the second latch output, and a drain coupled to a first arbiter output node, and a second transistor of the first conductivity type having a source coupled to the second latch output, a gate coupled to the first latch output, and a drain coupled to a second arbiter output node.

In this way, cross-coupled transistors can isolate arbiter output nodes from latch output nodes.

A metastability filter can further include a third transistor of a second conductivity type having a source coupled to a first supply node and a drain coupled to the first arbiter output node, and a fourth transistor of the second conductivity type having a source coupled to the first supply node and a drain coupled to the second arbiter output node.

In one particular arrangement, a metastability filter can further include gates of the third and fourth transistors being coupled to a second supply node. In this way, arbiter output nodes can be maintained in one state (not activated) by "leaker" type transistors.

In another particular arrangement, a metastability filter can further include the gate of the third transistor is coupled to the gate of the first transistor, and the gate of the fourth transistor is coupled to the gate of the second transistor. In this way, arbiter output nodes can be driven to an activated state by potentials at latch outputs.

The present invention can also include a method of arbitrating between first and second input signals. The method can include arbitrating between active first and second input signals by latching first and second input signals with cross-coupled logic gates to generate corresponding first and second latch outputs. The method can also include, if first and second latch outputs enter metastable levels, maintaining first and second arbiter output signals at inactive levels until the first and second latch outputs reach settled levels, and after a predetermined delay, forcing at least one of the latch output signals to the settled level.

In this way, if latch outputs are in a metastable state, such latch outputs are prevented from propagating further in a system, and are forced to a particular value if not resolved within the predetermined delay.

According to another aspect of the embodiments, forcing at least one of the output signals to a settled level can include activating a feedback signal after the first and second inputs signals are both active for the predetermined delay, and forcing the output of the one of the cross-coupled logic gates to the settled state in response to the feedback signal.

The present invention can also include an arbiter circuit that includes a latch with cross-coupled first and second logic gates. A first logic gate can have an input coupled to a first arbiter input and an output coupled to a first latch output, and a second logic gate can have an input coupled to a second arbiter input and an output coupled to a second latch output. At least one of the logic gates can force its output to a predetermined settled logic level in response to a feedback signal.

The arbiter circuit can also include a filter section coupled to a first latch output and second latch output. A filter section can maintain a first filter output node and a second filter output node at inactive levels unless a predetermined difference exists between the first and second latch outputs. A feedback circuit can be coupled to receive first and second input signals on the first and second arbiter inputs. The feedback circuit can activate a feedback signal after both the first and second input signals are active for a predetermined amount of time, and neither filter output node is at an active level.

According to another aspect of the embodiments, a feedback circuit can include a kick circuit that activates a kick signal after both the first and second input signals are active for the predetermined amount of time. In addition, determination logic gate can be included with a first input coupled to the first filter output node, a second input coupled to the second filter output node, a third input coupled to kick signal, and an output that provides the feedback signal.

According to another aspect of the embodiments, a filter section can include a first transistor having a source-drain path coupled between the first latch output and the first filter output node, and a gate coupled to the second latch output, and a second transistor of the same conductivity type as the first transistor, having a source-drain path coupled between the second latch output and the second filter output node, and a gate coupled to the first latch output.

BRIEF DESCRIPTION OF THE DRAWINGS

These and various other features and advantages of the present invention will be apparent upon reading of the following detailed description in conjunction with the accompanying drawings and the appended claims provided below, where:

DETAILED DESCRIPTION

The present invention is directed to an arbiter circuit or arbiter for resolving conflicts between competing inputs of a device. For example, the disclosed embodiments can resolve competing inputs of an asynchronous random access memory (RAM).

Generally, an arbiter circuit can include three parts: a latch, a filter section, and a feedback circuit that includes a "kicker" section that can ensure a metastability resolution time and/or avoid the generation of glitches like those that can arise in the conventional approaches. Such an arrangement may advantageously provide output signals that are more predictable than conventional approaches.

Figure 1:
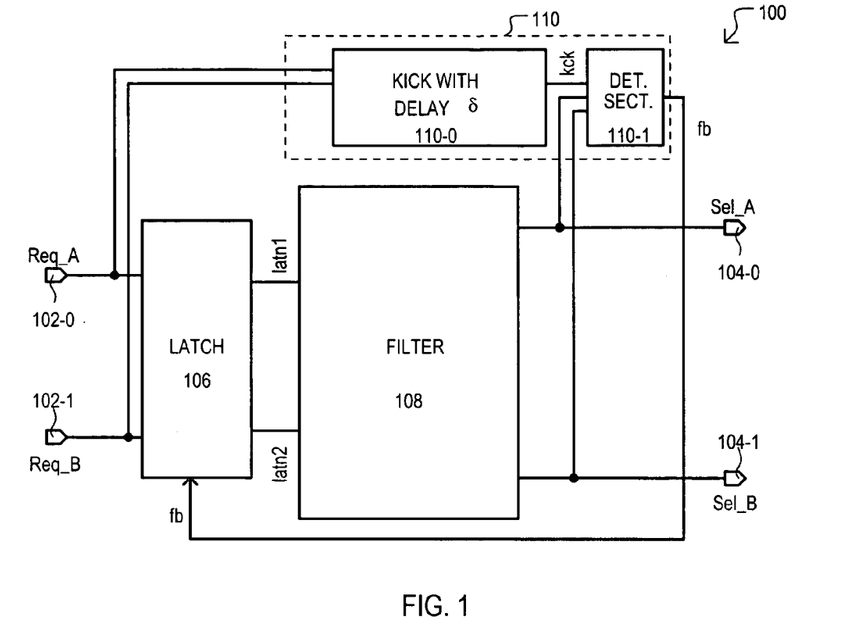
FIG. 1 is a block schematic diagram of a first embodiment of the present invention.

An arbiter circuit according to a first embodiment is set forth in FIG. 1, and designated by the general reference character 100. An arbiter circuit 100 can include a first input 102-0 that receives a first input signal Req_A and a second input 102-1 that receives a second input signal Req_B. Resolved output signals Sel_A and Sel_B can be provided on first output 104-0 and second output 104-1, respectively. Thus, signal Sel_A can be activated when input signal Req_A is determined to be a "winning" input signal, and signal Sel_B can be activated when input signal Req_B is determined to be a "winning" input signal.

As noted above, an arbiter circuit 100 can include a latch 106, a filter section 108 and a feedback circuit 110. A latch 106 can receive input signals (Req_A and Req_B) on first and second inputs (102-0 and 102-1), and provide latch output signals latn1 and latn2 on first and second outputs (104-0 and 104-1). A latch 106 can also receive a feedback signal "fb" generated by feedback circuit 110. A feedback signal "fb" can be activated (e.g., "kicked-in") a predetermined delay following a potentially metastable condition in the input signals (Req_A and Req_B). Preferably, and as described in more detail below with respect to other embodiments, a latch 106 may be a modified latch, having a different configuration than a conventional complementary metal-oxide-semiconductor (CMOS) cross-coupled NAND gate arrangement.

A filter section 108 can receive latch output signals (latn1 and latn2), and provide outputs signals (Req_A and Req_B). Preferably, and as described in more detail below with respect to other embodiments, a filter section 108 can prevent propagation of metastability states to the outputs.

It will be recalled that in the conventional arbiter circuit of FIG. 7, decision logic 706 generates a feedback signal fb in response to filtered output signals n<2> and n<3>. In contrast, the feedback circuit 110 of FIG. 1 operates in response to both input signals (Req_A and Req_B) as well output signals (Sel_A and Sel_B).

A feedback circuit 110 can include a kicker section 110-0 and a determination section 110-1. In the particular example shown, a kicker section 110-0 can provide kick signal "kck". A kick signal "kck" can be activated after input signals (Req_A and Req_B) have been in a potentially metastable inducing state for more than a predetermined time period (represented by delay symbol "δ"). For example, if it is assumed that both input signals (Req_A and Req_B) are active high, once both signals have been high for longer than a delay δ, kick signal "kck" can be activated.

A determination section 110-1 can activate a feedback signal "fb" in response to both filtered response output signals (Sel_A and Sel_B) and kick signal "kck". Thus, if an arbiter resolves a metastable condition (i.e., Req_A or Req_B) prior to delay δ, feedback signal fb will not be activated.

In this way, delay δ can prevent a feedback signal from being activated when latch 106 is undergoing its normal transition speed. That is, if latch 106 resolves a metastable condition within delay δ, feedback is not enabled. However, if the latch stays in metastable state for longer than delay δ, feedback can be enabled to resolve the state, and thereby give a bounded resolution time.

Accordingly, an arbiter circuit 100 can have a resolution time advantageously bounded by delay δ in the forward path of the kicker section 110-0 of feedback circuit 110.

Figure 2:
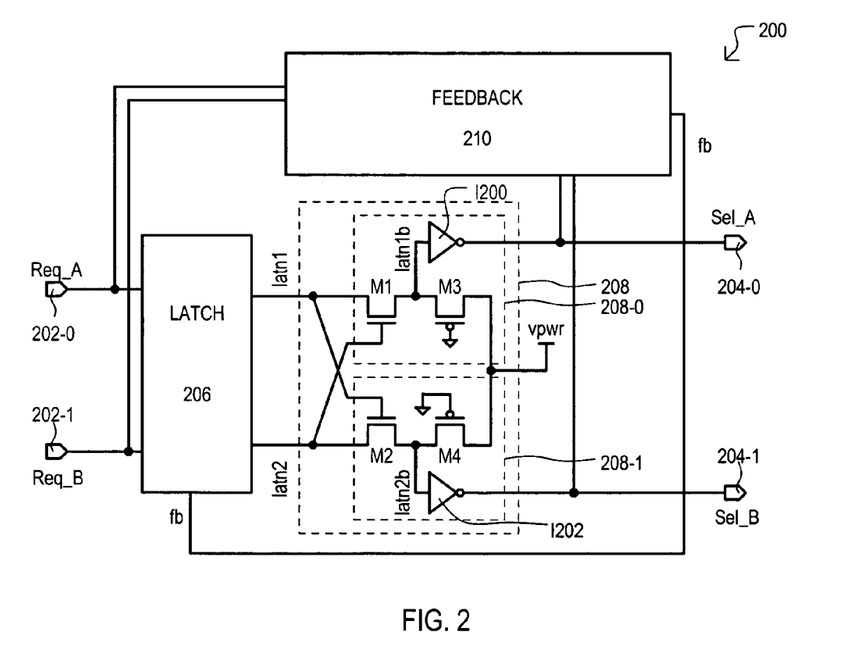
FIG. 2 is a block schematic diagram of a second embodiment of the present invention.

Referring now to FIG. 2, a second embodiment of the present invention is shown in a block schematic diagram and designated by the general reference character 200. Arbiter circuit 200 can include the same general components as that of the first embodiment of FIG. 1. Accordingly, like components will be referred to by the same reference character but with the first digit being a "2" instead of a "1".

FIG. 2 differs from FIG. 1 in that a filter section 208 is shown in more detail. A filter section 208 can include a first side 208-0 and a second side 208-1. It will be recalled that in the conventional arbiter circuit of FIG. 7, filter gates 704-0 and 704-1 were responsive to single latch output signals. In contrast, in the filter section 208 of FIG. 2, first signal path 208-0 receives both latch output signals (latn1 and latn2). Similarly, second signal path 208-1 receives both latch output signals (latn1 and latn2).

In the particular example shown, filter section 208 can include two N-type metal-oxide-semiconductor (NMOS) type devices (M1, M2) and two P-type MOS (PMOS) type devices (M3, M4). Further, filter section 208 is shown to include inverters I200 and I202, but it is understood such devices can be included to provide buffering for resulting output signals and/or appropriate logic values for feedback circuit 210.

A first side 208-0 of filter section 208 can include device M1, device M3, and inverter I200. Device M1 can have a source connected to receive latch output signal latn1, a gate connected to receive latch output signal latn2, and a drain connected to the drain of device M3. Device M3 can have a gate connected to a supply voltage (in this case ground) that can keep the device in an on state, and a source connected to a power supply voltage (vpwr). Inverter I200 can have an input connected to the drain—drain connection of devices M1 and M3.

Second side 208-1 can include devices M2 and M4 and inverter I202. Such devices can be connected in a mirror fashion to those of the first side 208-1.

Filtered output signals latn1b and latn2b can be provided at the drain—drain connections of devices M1/M3 and M2/M4, respectively.

If latch 206 is in a settled state (e.g., one of latch outputs latn1 or latn2 is low), a corresponding filtered output signal (latn1b or latn2b) will be low, and corresponding output signal (Sel_A or Sel_B) will be high. For example, if latch 206 is settled so that latn1 is low and latn2 is high (i.e., Req_A is a winning signal), within first side 208-0, device M1 can be turned on and overpower device M3, forcing filtered signal latn1b low. This value can be inverted by inverter I200 to generate a high output signal Sel_A. Within second side 208-1, device M2 can be turned off, resulting in device M4 pulling filtered signal latn2*b* high. This value is inverted by inverter I202 to force output signal Sel_B low.

If, however, latch 206 enters a metastable state, latch output signals (latn1 and latn2) can remain at approximately at the same voltage levels (otherwise, the latch would settle out of metastability). That is, if latch output signals (latn1 and latn2) do not vary from one another by more than a threshold voltage of devices M1 and M2, output signals (Sel_A and Sel_B) are maintained at inactive (in this case low) levels.

Accordingly, in a metastable condition, both devices M1 and M2 can have a small gate-to-source voltage, and are therefore remain off. At the same time, devices M3 and M4 can remain on, pulling filtered output signals (latn1*b* and latn2*b*) high. By operation of inverters I200 and I202, output signals Sel_A and Sel_B can remain low. As a result, a metastability condition of latch 206 is not reflected at outputs (204-0 and 204-1) of arbiter circuit 200.

In this way, an arbiter circuit 200 can include a metastability filter that is architecturally robust and can prevent metastability from propagating to other parts of the circuit.

Figure 3A:
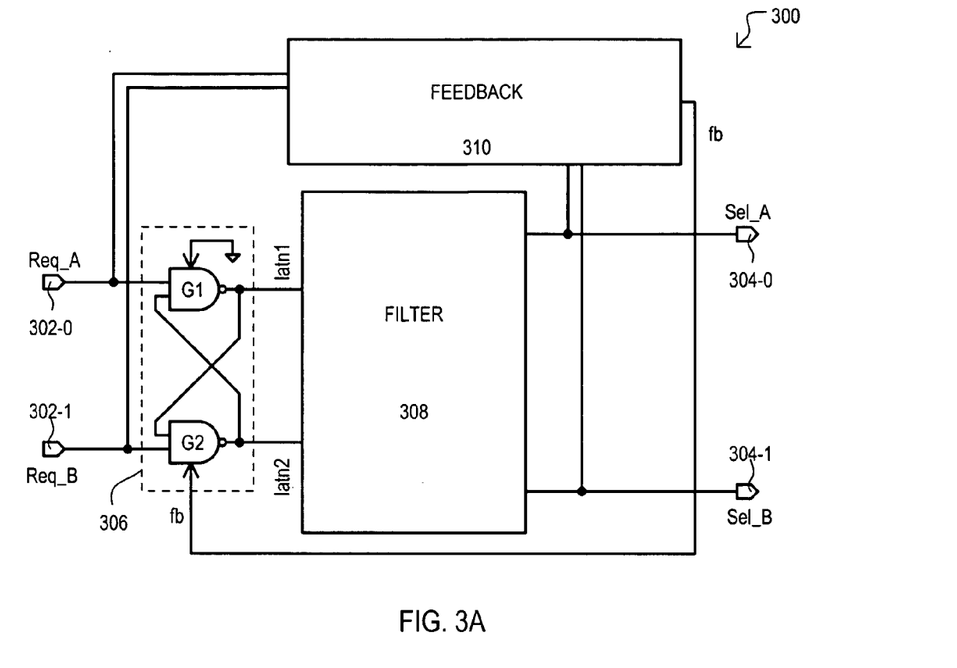
FIG. 3A is a block schematic diagram of a third embodiment of the present invention.
Figure 3B:
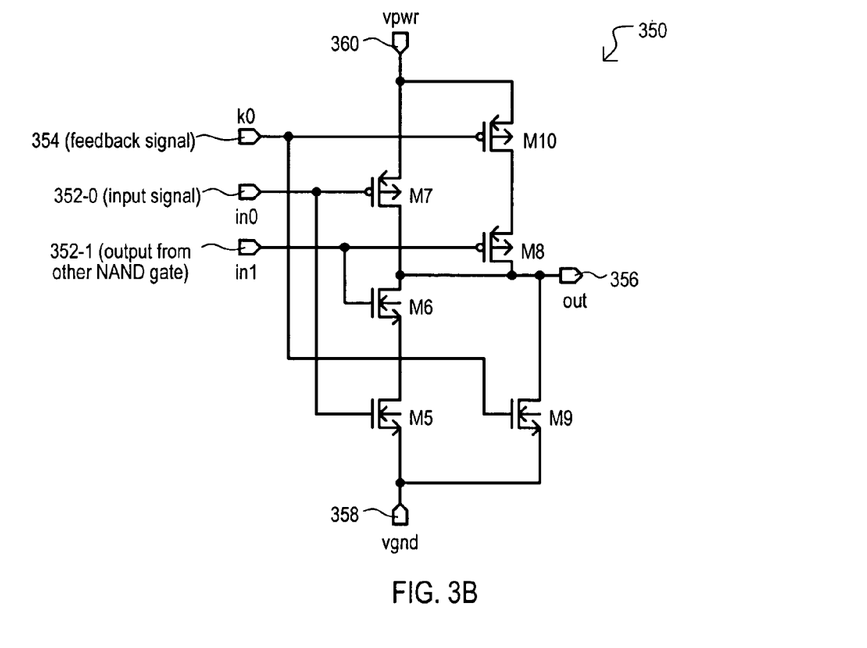
FIG. 3B is an example of a modified NAND circuit that can be included in a latch of the third embodiment.

Referring now to FIGS. 3A and 3B, a third embodiment of the present invention will be described. FIG. 3A is a block schematic diagram showing an arbiter circuit 300 according to a third embodiment. FIG. 3B is a schematic diagram showing a modified NAND gate that can be utilized in a latch of the third embodiment.

Referring to FIG. 3A, arbiter circuit 300 can include the same general components as that of the first embodiment of FIG. 1. Accordingly, like components will be referred to by the same reference character but with the first digit being a "3" instead of a "1".

FIG. 3A differs from FIG. 1 in that a latch 306 is shown in more detail. Latch 306 can include two-input NAND gates G1 and G2, configured in a cross-coupled manner. That is, gate G1 can have one input connected to first input 302-0, another input connected to the output of gate G2, and can provide first latch output signal latn1 at an output. Gate G2 can have an input connected to input 302-1 can provide second latch output signal latn2 at an output.

Referring still to FIG. 3A, in addition to the two inputs described above, each latch NAND gate (G1 and G2) can have a "feedback" input (represented by a signal received at the side of the gate). In the particular configuration shown, latch 306 is configured to favor input signal Req_B with respect to a feedback signal. Thus, gate G1 has a feedback input connected to a lower power supply, resulting in the gate operating in the same general fashion as a conventional CMOS NAND gate. However, gate G2 receives feedback signal "fb" at its feedback input. Thus, if feedback signal fb is activated, latch output signal latn2 will be forced low, resolving any metastable state.

FIG. 3B shows an example of a modified NAND gate that may be utilized as NAND gate G2 or both NAND gates G1 and G2 of FIG. 3. A modified NAND gate 350 can include first standard input 352-0, second standard input 352-1, feedback input 354, and output 356. Preferably, a first standard input 352-0 can receive an input signal while a second standard input 352-1 can receive a cross-coupled output signal (i.e., output signal from the other gate of a latch).

Referring still to FIG. 3B, modified NAND gate 350 can also include NMOS devices M5 and M6 arranged in series between output 356 and a low supply node 358, which can be connected to a low power supply voltage (vgnd). PMOS devices M7 and M8 can be arranged in parallel with one another between output 356 and a high supply node 360, which can be connected to a high power supply voltage (vpwr). Gates of these devices can receive input signals (in0 and in1) from standard inputs (352-0 and 352-1) in the same general fashion as a conventional CMOS NAND gate.

Unlike a conventional three-input CMOS NAND gate, modified NAND gate 350 can include NMOS feedback device M9 with a source-drain path in parallel with devices M5 and M6, between output 354 and low power supply node 358. In addition, a PMOS feedback device M10 can be included with a source-drain path arranged in series with device M8, between output 354 and high power supply node 360. Both devices M9 and M10 can have gates connected to feedback input 354.

Referring still to FIG. 3B, in operation, when a feedback input signal (k0) is low, modified NAND gate 350 can behave as a standard two input CMOS NAND gate. However, when a feedback input signal (k0) is high, device M10 can be turned of, and device M9 can be turned on, and output node 356 is pulled low and prevented from being pulled high by operation of second standard input signal (in1).

In this way, a modified NAND gate can rapidly resolve a metastable state in response to an activated feedback signal.

Figure 4A:
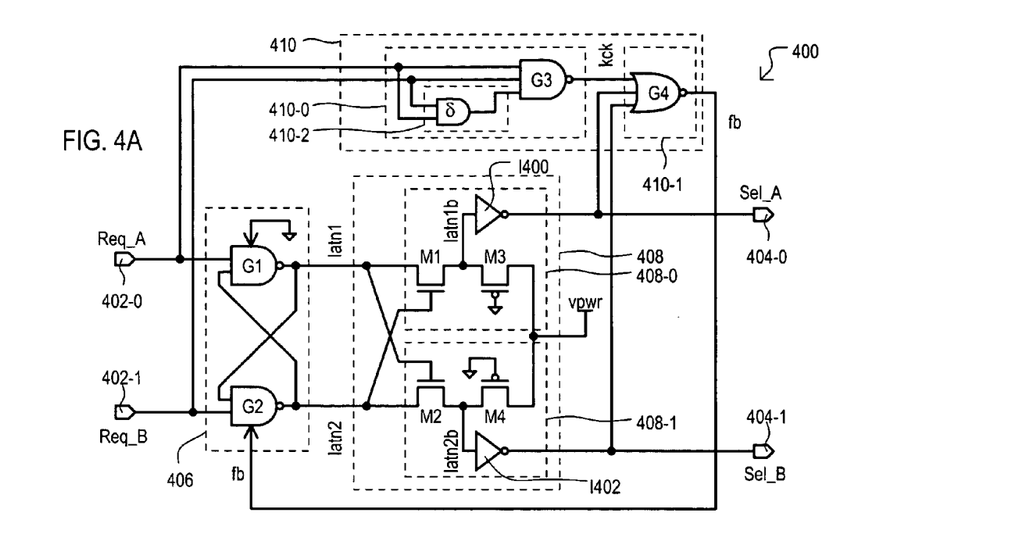
FIG. 4A is a block schematic diagram of a fourth embodiment of the present invention.
Figure 4B:
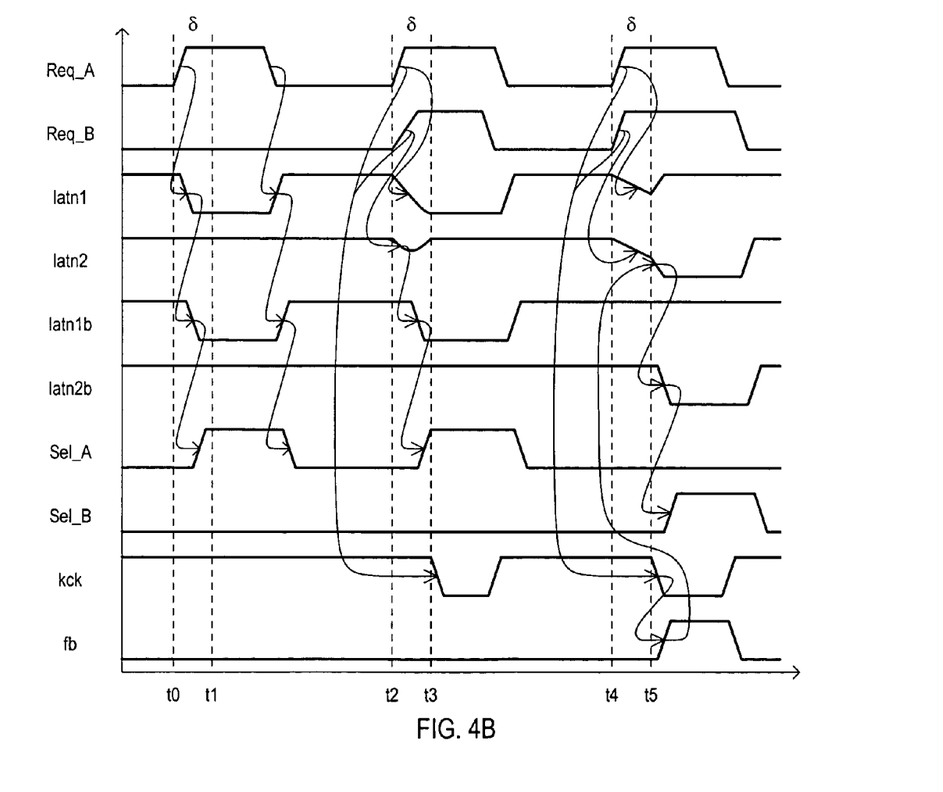
FIG. 4B is timing diagram illustrating the operation of the fourth embodiment.

Referring now to FIGS. 4A and 4B, a fourth embodiment of the present invention will now be described. A fourth embodiment arbiter circuit 400 can include some of the same general components of the embodiment of FIG. 1. Accordingly, like components will be referred to by the same reference character but with the first digit being a "4" instead of a "1". In addition, an arbiter circuit 400 can include a filter section 408 like that shown as 208 in FIG. 2 and a latch 406 like that shown as 306 in FIG. 3A.

FIG. 4A also shows in detail one particular implementation of a feedback circuit 410. Like the first embodiment, the feedback circuit 410 of FIG. 4A can include a kicker section 410-0 and determination section 410-1. A kicker section 410-0 can include a delay element 410-2 and kicker gate G3. A delay element 410-2 may be, a two input AND gate, having both gate inputs connected to first and second inputs 402-0 and 402-1, or an equivalent delay structure. It is understood that once both inputs to delay element 410-2 are high, the output of the delay element will not be driven high until a predetermined delay δ.

Kicker gate G3 can be a three-input NAND gate having two inputs connected to first and second inputs 402-0 and 402-1, and a third input connected to the output of delay element 410-2. The output of kicker gate G3 can be kick signal "kck". It is understood that such an arrangement, kicker signal kck can have a delay dependent upon the transition type of input signals Req_A and Req_B. More particularly, once both input signals (Req_A and Req_B) are high, kicker signal kck will not transition low until after predetermined delay δ. However, kicker signal will transition high, essentially without delay, once either input signal (Req_A or Req_B) transitions low.

The particular determination section 410-1 of FIG. 4A can include a three-input NOR gate G4, having inputs connected to first and second outputs (404-0 and 404-1), and a third input connected to receive the kick signal "kck". The output of gate G4 can provide the feedback signal "fb".

Having described the arrangement of the fourth embodiment, the operation of arbiter circuit 400 will now be described with reference to FIGS. 4A and 4B. FIG. 4B is a timing diagram showing waveforms for first and second input signals (Req_A and Req_B), first and second latch output signals (latn1 and latn2), first and second filter output signals (latn1*b* and latn2*b*), output signals (Sel_A and Sel_B), kick signal (kck), and feedback signal (fb).

At time t0, first input signal Req_A transitions high, while second input signal Req_B remains low. This represents a "non-conflicting" stable case where latch 406 can easily transition to a settled state. By operation of cross-coupled gates G1 and G2, first latch output signal latn1 can be driven low, while latch output signal latn2 can remain high. Because the difference between potentials of latn1 and latn2 exceed the threshold voltage of device M1, device M1 can be turned on, driving first filtered output signal latn1*b* low, while second filtered output signal latn2*b* can remain high. Consequently, first output signal Sel_A can be driven high by operation of inverter I400.

Because input signal Req_B remains inactive (low in this example), kick signal "kck" is not activated.

Prior to time t2, input signals (Req_A and Req_B) can return to inactive levels.

At time t2, first and second input signals (Req_A and Req_B) can both transition high. Because both input signals remain active, after predetermined delay δ, kicker section 410-0 can activate kick signal "kck" (force "kck" low, in this example). However, in the example shown, sufficient difference exists between the input signals (Req_A and Req_B) to enable latch 406 to resolve conflicting active signals in favor of first input signal Req_A prior to predetermined delay δ. Consequently, first output signal Sel_A can transition high prior to kick signal "kck" transitioning low, preventing the activation of feedback signal "fb". Such an arrangement can help prevent the generation of glitches, and the like.

Prior to time t4, input signals (Req_A and Req_B) can once again return to inactive levels.

At time t4, first and second input signals (Req_A and Req_B) can both transition high once again. After predetermined delay δ, kicker section 410-0 can activate kick signal "kck". The operation starting at time t4 shows a metastable state that cannot be rapidly resolved by latch 406. Thus, both latch output signals latn1 and latn2 remain at potentials that track one another. Consequently, devices M1 and M2 within filter section 408 remain off, and output signals (Sel_A and Sel_B) remain inactive. With both output signals (Sel_A and Sel_B) inactive, once kick signal "kck" transitions low, the other two inputs of gate G4 are also low, resulting in feedback signal "fb" being driven high. The high feedback signal "fb" can force second latch output latn2 low, forcing a resolution of the metastable state.

It will be appreciated that an arbiter according to the present invention can provide numerous advantages over conventional approaches, including but not limited to:

(i) A robust metastability filter that does not propagate metastable states. The topology of such a filter can provide the desired response as constructed, and is not subject to threshold voltage mismatches that can occur in conventional arrangements.

(ii) Output values that can be essentially glitch free and include a bounded resolution time.

(iii) The circuit can reliably generate predictable output states.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching.

Figure 5:
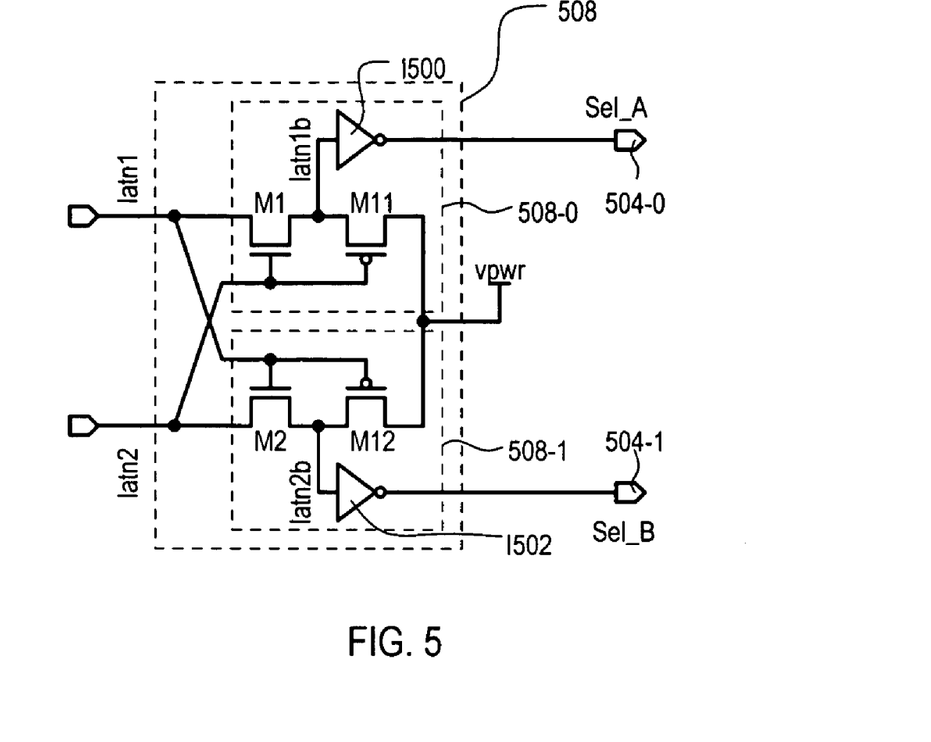
FIG. 5 is a schematic diagram of an alternate filter section that can be included in the embodiments.

As but one of the many possible variations, a second filter section is shown in FIG. 5, and designated by the general reference character 508. A filter section 508 can include some of the same circuit components as filter 208 shown in FIG. 2. Accordingly, like components are labeled with the same reference character, but with the first digit being a "5" instead of a "2".

Filter section 508 can include PMOS devices M11 and M12 having the same source-drain connection as PMOS devices M3 and M4, respectively, of FIG. 2. Filter section 508 can differ from that of FIG. 2 in that device M11 can have a gate connected to the gate of device M1, and device M12 can have a gate connected to the gate of device M2. In such an arrangement, the same potential difference between latch outputs (latn1 and latn2) that turn on devices M1 and M2, and turn on devices M12 and M11.

It is also understood that other embodiments of this invention may be practiced in the absence of an element/step not specifically disclosed herein.

Thus, it is intended that the scope of the invention encompass the generic area as herein disclosed, and by the claims appended hereto and their equivalents.

What is claimed is:

1. An asynchronous arbiter, comprising:
a latch having a first arbiter input coupled to a first input signal and a second arbiter input coupled to a second input signal, a first latch output, a second latch output, and a third input different from the first and second latch outputs; and
a feedback circuit that includes
a kicker circuit coupled to the first and second input signals that activates a kick signal in response to the first and second input signals having predetermined logic values with respect to one another, and
feedback logic that activates a feedback signal when a first arbiter output signal, a second arbiter output signal, and the kick signal, have predetermined logic values with respect to one another, the feedback signal being coupled to the third input of the latch.

2. The asynchronous arbiter of claim 1, wherein:
the kicker circuit includes a kicker logic gate having at least a first kicker gate input coupled to the first arbiter input, a second kicker gate input coupled to the second arbiter input, and a kicker gate output that provides the kick signal.

3. The asynchronous arbiter of claim 1, wherein:
the kicker circuit includes a delay circuit that delays the activation of the kick signal by a predetermined amount with respect to the first and second input signals.

4. The asynchronous arbiter of claim 3, wherein:
the latch provides a first latch output signal on a first latch output and a second latch output signal on a second latch output, and forces the first and second latch output values to predetermined settled values within a normal settling time when first and second input signal transitions do not introduce a metastable condition; and
the predetermined amount of delay of the delay circuit is no less than the normal settling time.

5. The asynchronous arbiter of claim 3, wherein:
the delay circuit introduces one predetermined amount of delay in response to at least one input signal rising, and another predetermined amount of delay in response to the at least one input signal falling.

6. The asynchronous arbiter of claim 3, wherein:
the kicker circuit further includes
  a kicker logic gate having at least a first kicker gate input coupled to the first input, a second kicker gate input coupled to the second input, a third kicker gate input, and a kicker gate output that provides the kick signal, and
  the delay circuit has delay circuit inputs coupled to the first and second arbiter inputs, and an output coupled to the third kicker gate input.

7. The asynchronous arbiter of claim 1, wherein:
the latch provides a first latch output signal on a first latch output and a second latch output signal on a second latch output, the latch forcing the first and second latch output values to predetermined settled values in response to the feedback signal being activated.

8. The asynchronous arbiter of claim 7, wherein:
the latch includes
  a first logic gate having one first gate input coupled to one of the arbiter inputs, another first gate input, and a first gate output, and
  a second logic gate having one second gate input coupled to the other of the arbiter inputs, another second gate input coupled to the first gate output, and a second gate output coupled to the other first gate input, the second logic gate forcing the second gate output to a predetermined settled value in response to the feedback signal being activated.

9. The asynchronous arbiter of claim 8, wherein:
the second logic gate includes
a first gate transistor of a first conductivity type having a source-drain path coupled between one power supply and the second gate output, and gate coupled to the other of the arbiter inputs,
a second gate transistor of the first conductivity type having a source-drain path arranged in series with that of the first gate transistor between the one power supply and the second gate output, and a gate coupled to the one of the arbiter inputs,
a third gate transistor of a second conductivity type having a source-drain path coupled between another power supply and the second gate output, and a gate coupled to other of the arbiter inputs,
a fourth gate transistor of the second conductivity type having a source-drain path in parallel with that of the third gate transistor between the other power supply and the second gate output, and a gate coupled the one of the arbiter inputs,
a first feedback transistor of the first conductivity type having a source-drain path in parallel with that of the first and second gate transistors between the one power supply and the second gate output, and a gate coupled to receive the feedback signal, and
a second feedback transistor of the second conductivity type having a source-drain path in series with that of the fourth gate transistor between the other power supply and the second gate output, and a gate coupled to receive the feedback signal.

10. The asynchronous arbiter of claim 1, wherein:
the latch provides a first latch output signal on a first latch output and a second latch output signal on a second latch output; and
a metastability filter that generates a first arbiter output signal and second arbiter output signal that follow the first latch output signal and second latch output signals when said latch output signals are in a settled state, and maintains the first and second arbiter output signals at inactive levels response to the first latch output signals and second latch output signals differing from one another by less than a predetermined limit.

11. The asynchronous arbiter of claim 10, wherein:
the predetermined limit is a transistor threshold voltage.

12. The asynchronous arbiter of claim 10, wherein:
the metastability filter includes
  a first transistor of a first conductivity type having a source coupled to the first latch output, a gate coupled to the second latch output, and a drain coupled to a first arbiter output node, and
  a second transistor of the first conductivity type having a source coupled to the second latch output, a gate coupled to the first latch output, and a drain coupled to a second arbiter output node.

13. The asynchronous arbiter of claim 12, wherein:
the metastability filter further includes
  a third transistor of a second conductivity type having a source coupled to a first supply node and a drain coupled to the first arbiter output node, and
  a fourth transistor of the second conductivity type having a source coupled to the first supply node and a drain coupled to the second arbiter output node.

14. The asynchronous arbiter of claim 13, wherein:
the gates of the third and fourth transistors are coupled to a second supply node.

15. The asynchronous arbiter of claim 13, wherein:
the gate of the third transistor is coupled to the gate of the first transistor, and
the gate of the fourth transistor is coupled to the gate of the second transistor.

16. A method of arbitrating between first and second input signals, comprising the steps of:
  arbitrating between active first and second input signals by latching the first and second input signals with cross-coupled logic gates to generate corresponding first and second latch outputs; and
  if first and second latch outputs enter metastable levels, maintaining first and second arbiter output signals at inactive levels until the first and second latch outputs reach settled levels by preventing the arbiter output signals from being driven to an active level in response to a difference in between first and second latch outputs not exceeding a predetermined level, and
  after a predetermined delay, forcing at least one of the latch output signals to a settled level in response to the first and second input signals.

17. The method of claim 16, wherein:
forcing at least one of the latch output signals to a settled level includes activating a feedback signal after the first and second inputs signals are both active for the predetermined delay, and
forcing the output of the one of the cross-coupled logic gates to the settled state in response to the feedback signal.

18. An arbiter circuit, comprising:
a latch including cross-coupled first and second logic gates, the first logic gate having an input coupled to a first arbiter input and an output coupled to a first latch output, and the second logic gate having an input coupled to a second arbiter input and an output coupled to a second latch output, at least one of the logic gates forcing its output to a predetermined settled logic level in response to a feedback signal received at a feedback latch input that is different from the first and second latch outputs;

a filter section coupled to the first latch output and second latch output, the filter section maintaining a first filter output node and a second filter output node at inactive levels unless a predetermined difference exists between the first and second latch outputs; and a feedback circuit coupled to receive first and second input signals on the first and second arbiter inputs that activates the feedback signal after both the first and second input signals are active for a predetermined amount of time, and neither filter output node is at an active level.

19. The arbiter circuit of claim 18, wherein:

the feedback circuit includes a kicker circuit that activates a kick signal after both the first and second input signals are active for the predetermined amount of time, and a determination logic gate having a first input coupled to the first filter output node, a second input coupled to the second filter output node, a third input coupled to the kick signal, and an output that provides the feedback signal.

20. The arbiter circuit of claim 18, wherein:

the filter section includes a first transistor having a source-drain path coupled between the first latch output and the first filter output node, and a gate coupled to the second latch output, and a second transistor of the same conductivity type as the first transistor, having a source-drain path coupled between the second latch output and the second filter output node, and a gate coupled to the first latch output.

* * * * *

UNITED STATES PATENT AND TRADEMARK OFFICE
CERTIFICATE OF CORRECTION

PATENT NO. : 7,225,283 B1 Page 1 of 1
APPLICATION NO. : 11/019702
DATED : May 29, 2007
INVENTOR(S) : Anup Nayak et al.

It is certified that error appears in the above-identified patent and that said Letters Patent is hereby corrected as shown below:

At column 7, line 67, please replace "6" with -- $\delta$ -- so that the corresponding phrase reads -- (represented by delay symbol "$\delta$") --.

At column 14, line 1, Claim 10, please insert --in-- between "levels" and "response" so that the corresponding phrase reads -- levels in response --.

At column 14, line 1, Claim 10, please replace "signals" with --signal-- so that the corresponding phrase reads -- first latch output signal --.

At column 14, line 2, Claim 10, please replace "signals" with --signal-- so that the corresponding phrase reads -- second latch output signal --.

Signed and Sealed this

Twenty-seventh Day of May, 2008

JON W. DUDAS
*Director of the United States Patent and Trademark Office*